(12) United States Patent
Parris

(10) Patent No.: US 9,042,693 B2
(45) Date of Patent: May 26, 2015

(54) WATER-SOLUBLE WATER-BLOCKING ELEMENT

(75) Inventor: Don Parris, Newton, NC (US)

(73) Assignee: Draka Comteq, B.V., Amsterdam (NL)

( * ) Notice: Subject to any disclaimer, the term of this patent is extended or adjusted under 35 U.S.C. 154(b) by 1048 days.

(21) Appl. No.: 13/009,118

(22) Filed: Jan. 19, 2011

(65) Prior Publication Data

US 2011/0176782 A1  Jul. 21, 2011

Related U.S. Application Data

(60) Provisional application No. 61/296,527, filed on Jan. 20, 2010.

(51) Int. Cl.
*G02B 6/44*  (2006.01)

(52) U.S. Cl.
CPC .................................. *G02B 6/4494* (2013.01)

(58) Field of Classification Search
None
See application file for complete search history.

(56) References Cited

U.S. PATENT DOCUMENTS

| | | | |
|---|---|---|---|
| 4,113,349 A | 9/1978 | Stiles | |
| 4,211,591 A | 7/1980 | Stiles | |
| 4,232,935 A | 11/1980 | Rohner et al. | |
| 4,239,335 A | 12/1980 | Stiles | |
| 4,729,629 A | 3/1988 | Saito et al. | |
| 4,838,643 A | 6/1989 | Hodges et al. | |
| 4,909,592 A | 3/1990 | Arroyo et al. | |
| 5,138,685 A | 8/1992 | Arroyo et al. | |
| 5,157,752 A | 10/1992 | Greveling et al. | |
| 5,179,611 A | 1/1993 | Umeda et al. | |
| 5,246,770 A | 9/1993 | Bottiglione et al. | |
| 5,278,217 A | 1/1994 | Umeda et al. | |
| 5,350,617 A | 9/1994 | Fujisawa et al. | |
| 5,369,720 A | 11/1994 | Parry et al. | |
| 5,574,816 A | 11/1996 | Yang et al. | |
| 5,589,256 A | 12/1996 | Hansen et al. | |
| 5,649,041 A * | 7/1997 | Clyburn et al. | ............... 385/109 |
| 5,717,805 A | 2/1998 | Stulpin | |

(Continued)

FOREIGN PATENT DOCUMENTS

| | | |
|---|---|---|
| EP | 0361863 A1 | 4/1990 |
| EP | 0532750 A1 | 3/1993 |

(Continued)

OTHER PUBLICATIONS

Aquasol Corporation, Aquasolpaper, http://www.aquasolpaper.com/characteristics, pp. 1-2, downloaded on Nov. 16, 2009.

Bluestar Silicones, product specification sheet for "Silbione RTV-4410 A/B," www.bluestarsilicones.com, Jun. 2007, pp. 1-2.

U.S. Appl. No. 12/098,804 for a "Transmission Optical Fiber Having Large Effective Area," Sillard et al., filed May 6, 2009 [Cited in Specification].

(Continued)

*Primary Examiner* — Michelle R Connelly

(74) *Attorney, Agent, or Firm* — Additon, Higgins & Pendleton, P.A.

(57) ABSTRACT

The present invention provides optical-fiber communication cables with an improved water-blocking element that reduces or eliminates microbending caused by water-swellable particulate powders. In one embodiment, such water-swellable powders may be employed in conjunction with a smooth water-soluble carrier tape. In another embodiment, such water-swellable powders may embedded within a water-soluble binder. The water-blocking element is deployed within optical-fiber buffer tubes to water-block the buffer tubes and to minimize microbending that can occur when water-swellable particulate powders press against optical fibers.

19 Claims, 1 Drawing Sheet

(56) References Cited

U.S. PATENT DOCUMENTS

| | | | |
|---|---|---|---|
| 5,736,595 A | 4/1998 | Gunther et al. | |
| 5,761,362 A | 6/1998 | Yang et al. | |
| 5,911,023 A | 6/1999 | Risch et al. | |
| 5,925,461 A | 7/1999 | Fairgrieve | |
| 5,982,968 A | 11/1999 | Stulpin | |
| 6,035,087 A | 3/2000 | Bonicel et al. | |
| 6,051,317 A | 4/2000 | Brueggemann et al. | |
| 6,066,397 A | 5/2000 | Risch et al. | |
| 6,085,009 A | 7/2000 | Risch et al. | |
| 6,134,363 A | 10/2000 | Hinson et al. | |
| 6,151,434 A | 11/2000 | Bonicel | |
| 6,173,100 B1 | 1/2001 | Newton et al. | |
| 6,175,677 B1 | 1/2001 | Yang et al. | |
| 6,178,278 B1 | 1/2001 | Keller et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,253,012 B1 | 6/2001 | Keller et al. | |
| 6,304,701 B1 * | 10/2001 | Bringuier et al. | 385/106 |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,348,236 B1 | 2/2002 | Fairgrieve et al. | |
| 6,374,023 B1 | 4/2002 | Parris | |
| 6,381,390 B1 | 4/2002 | Hutton et al. | |
| 6,463,199 B1 | 10/2002 | Quinn et al. | |
| 6,493,491 B1 | 12/2002 | Shen et al. | |
| 6,504,979 B1 | 1/2003 | Norris et al. | |
| 6,577,796 B2 | 6/2003 | Anelli et al. | |
| 6,603,908 B2 | 8/2003 | Dallas et al. | |
| 6,618,538 B2 | 9/2003 | Nechitailo et al. | |
| 6,631,229 B1 * | 10/2003 | Norris et al. | 385/109 |
| 6,658,184 B2 | 12/2003 | Bourget et al. | |
| 6,677,394 B1 | 1/2004 | Butterbach et al. | |
| 6,748,146 B2 | 6/2004 | Parris | |
| 6,749,446 B2 | 6/2004 | Nechitailo | |
| 6,757,465 B1 | 6/2004 | Yokokawa et al. | |
| 6,847,768 B2 | 1/2005 | Lail et al. | |
| 6,906,131 B2 | 6/2005 | Ahmed et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 6,970,629 B2 | 11/2005 | Lail et al. | |
| 7,006,740 B1 | 2/2006 | Parris | |
| 7,045,010 B2 | 5/2006 | Sturman, Jr. | |
| 7,087,842 B2 | 8/2006 | Belli et al. | |
| 7,162,128 B2 | 1/2007 | Lovie et al. | |
| 7,171,086 B2 | 1/2007 | Engel | |
| 7,177,507 B2 | 2/2007 | Parsons et al. | |
| 7,231,119 B2 | 6/2007 | Rhoney et al. | |
| 7,236,670 B2 | 6/2007 | Lail et al. | |
| 7,254,302 B2 | 8/2007 | Parsons et al. | |
| 7,254,303 B2 | 8/2007 | Parsons | |
| 7,277,615 B2 | 10/2007 | Greenwood et al. | |
| 7,322,122 B2 | 1/2008 | Overton et al. | |
| 7,336,873 B2 | 2/2008 | Lail et al. | |
| 7,346,244 B2 | 3/2008 | Gowan et al. | |
| 7,349,607 B2 | 3/2008 | Schneider et al. | |
| 7,356,234 B2 | 4/2008 | de Montmorillon et al. | |
| 7,471,861 B2 | 12/2008 | Schneider et al. | |
| 7,483,613 B2 | 1/2009 | Bigot-Astruc et al. | |
| 7,515,795 B2 | 4/2009 | Overton et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,574,095 B2 | 8/2009 | Lock et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,630,605 B2 | 12/2009 | Bringuier et al. | |
| 7,639,915 B2 | 12/2009 | Parris et al. | |
| 7,646,952 B2 | 1/2010 | Parris | |
| 7,724,998 B2 | 5/2010 | Parris et al. | |
| 7,817,891 B2 | 10/2010 | Lavenne et al. | |
| 7,970,247 B2 * | 6/2011 | Barker | 385/100 |
| 2002/0154873 A1 | 10/2002 | Sheu | |
| 2005/0180704 A1 | 8/2005 | Terry et al. | |
| 2007/0098339 A1 | 5/2007 | Bringuier et al. | |
| 2007/0269172 A1 | 11/2007 | Parson et al. | |
| 2008/0176475 A1 | 7/2008 | Sahasrabudhe et al. | |
| 2008/0274316 A1 | 11/2008 | Griffith et al. | |
| 2008/0292262 A1 | 11/2008 | Overton et al. | |
| 2009/0175583 A1 | 7/2009 | Overton | |
| 2009/0190890 A1 | 7/2009 | Freeland et al. | |
| 2009/0214167 A1 | 8/2009 | Lookadoo et al. | |
| 2009/0252469 A1 | 10/2009 | Sillard et al. | |
| 2009/0279833 A1 * | 11/2009 | Overton et al. | 385/111 |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0214649 A1 | 8/2010 | Burov et al. | |
| 2010/0254653 A1 | 10/2010 | Molin et al. | |
| 2010/0310218 A1 | 12/2010 | Molin et al. | |

FOREIGN PATENT DOCUMENTS

| | | | |
|---|---|---|---|
| EP | 1298477 A2 | | 4/2003 |
| EP | 1746447 A2 | | 1/2007 |
| EP | 1921478 A1 | | 5/2008 |
| EP | 2204681 A1 | | 7/2010 |
| JP | 03173640 A | * | 7/1991 |
| JP | 04346302 A | * | 12/1992 |
| WO | 2008/066782 A2 | | 6/2008 |
| WO | 2009/062131 A1 | | 5/2009 |

OTHER PUBLICATIONS

U.S. Appl. No. 12/878,449 for a "Multimode Optical Fiber Having Improved Bending Losses," Molin et al., filed Sep. 9, 2010 [Cited in Specification].

U.S. Appl. No. 12/884,834 for a "Multimode Optical Fiber," Molin et al., filed Sep. 17, 2010 [Cited in Specification].

U.S. Appl. No. 12/887,813 for a "Optical Fiber for Sum-Frequency Generation," Richard et al., filed Sep. 22, 2010 [Cited in Specification].

U.S. Appl. No. 12/953,948 for a "High-Bandwidth, Multimode Optical Fiber with Reduced Cladding Effect," Molin et al., filed Nov. 24, 2010 [Cited in Specification].

U.S. Appl. No. 12/954,036 for a "High-Bandwidth, Dual-Trench-Assisted Multimode Optical Fiber," Molin et al., filed Nov. 24, 2010 [Cited in Specification].

U.S. Appl. No. 12/959,688 for a "Multimode Optical Fiber with Low Bending Losses and Reduced Cladding Effect," Molin et al., filed Dec. 3, 2010 [Cited in Specification].

U.S. Appl. No. 12/959,866 for a "High-Bandwidth Multimode Optical Fiber Having Reduced Bending Losses," Molin et al., filed Dec. 3, 2010 [Cited in Specification].

* cited by examiner

WATER-SOLUBLE WATER-BLOCKING ELEMENT

CROSS-REFERENCE TO PRIORITY APPLICATION

This application hereby claims the benefit of U.S. Patent Application No. 61/296,527, for a Water-Soluble Water-Blocking Element (filed Jan. 20, 2010), which is hereby incorporated by reference in its entirety.

FIELD OF THE INVENTION

The present invention relates to an optical-fiber cable that includes a water-soluble water-blocking element.

BACKGROUND

Water blocking in optical-fiber buffer tubes and fiber optic cables typically has been accomplished by using petroleum-based filling gels (e.g., grease). By completely filling all of the free space inside a buffer tube that contains an optical fiber or optical-fiber bundle, the filling gel blocks the ingress of water into the fiber optic cable.

Moreover, being a thixotropic material, the filling gel also tends to mechanically couple the optical fiber(s) to the buffer tube. Such mechanical coupling prevents the optical fiber(s) from retracting inside the buffer tube as the buffer tube is processed during manufacturing, as the cable is installed or otherwise handled in the field, or as the cable is subjected to thermally induced dimensional changes from environmental exposure.

Although relatively effective for controlling cable flooding, the petroleum-based filling gels are inconvenient during cable repair and optical-fiber splicing. The use of such gels requires cleaning the petroleum-based material from optical fibers prior to splicing (and sometimes from equipment and personnel, too), which can be messy and time consuming. Consequently, using conventional filling greases is often undesirable.

Various dry-cable designs have been developed to eliminate filling greases while providing some water-blocking and coupling functions. In either loose tube fiber cables or ribbon cables, a totally dry design eliminates the filling gel from the enclosed buffer tubes. In a totally dry cable, for example, filling gel may be replaced by a water-blocking element, such as a tape or a yarn carrying a water-swellable material (e.g., water-swellable powder). Water-swellable powders are dry to the touch and, when bound to a carrier tape or yarn, can be readily removed during field operations (e.g., splicing).

Optical fibers are sensitive to mechanical loads, which can cause undesirable microbending. Those having ordinary skill in the art know that microbending is induced when small stresses are applied along the length of an optical fiber, perturbing the optical path through microscopically small deflections in the core.

Water-swellable powders consist of finely ground hard particles. The size and hardness of such particulates may be sufficient to cause microbending and optical attenuation in the optical fibers they contact.

Accordingly, there is a need for a more effective solution to dry cable design. In particular, there is a need for a grease-free water-blocking element that reduces microbending losses in optical fibers yet effectively blocks the longitudinal movement of water inside a fiber optic cable and its constituent buffer tubes.

SUMMARY

In one aspect, the present optical-fiber cable includes at least one buffer tube in which an improved water-blocking element at least partially surrounds one or more optical fibers. Stated otherwise, the water-blocking element is positioned between the optical fiber(s) and its surrounding buffer tube, all within a cable jacket (e.g., polymeric jacketing).

In one embodiment, the water-blocking element includes water-swellable particulate powder bonded to a water-soluble carrier tape. The water-soluble carrier tape is positioned adjacent to the optical fiber(s) such that the water-swellable particulate powder is separated from the optical fiber(s). In the presence of water, the water-soluble carrier tape will dissolve, thus facilitating the transport of water toward the water-swellable particulate powder.

In another embodiment, the water-blocking element includes fibers and water-swellable particulate powder embedded within a water-soluble binder. The water-blocking element typically has a substantially smooth surface positioned adjacent to the optical fiber(s). In the presence of water, the water-soluble binder will dissolve, thus facilitating the transport of water toward the water-swellable particulate powder.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention, which embraces an improved, dry optical-fiber cable possessing water-blocking capabilities, is described herein with reference to the accompanying drawings. That said, the present invention may be embodied in many different forms and should not be construed as limited to the exemplary embodiments set forth herein.

Figure 1:
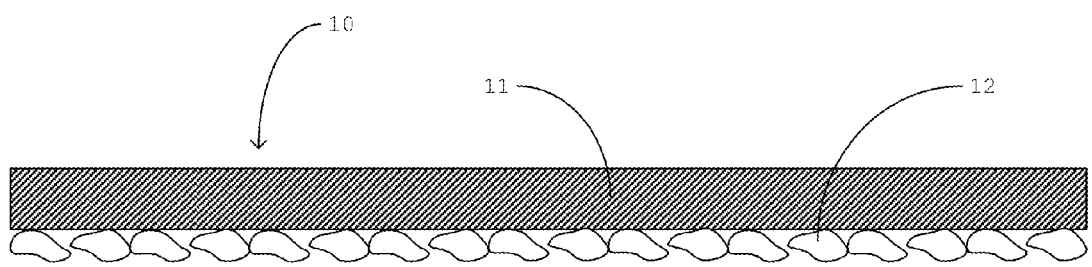
FIG. 1 schematically depicts a cross-sectional view of an exemplary two-layer water-blocking element according the present invention in which water-swellable powder is bonded to a water-soluble carrier tape.

FIG. 1 schematically depicts a water-blocking element 10 according to one aspect of the present invention. FIG. 1 depicts the water-blocking element 10 as having a two-layer structure. In particular, the water-blocking element 10 includes water-swellable particulate powder 12 bonded (e.g., with an adhesive material) to a water-soluble carrier tape 11, typically a relatively smooth water-soluble carrier tape. Exemplary water-soluble carrier tapes may include water-soluble polymers such as methyl cellulose, ethyl cellulose, hydroxyethyl cellulose, latex powders, cellulose ethers, and polyvinyl alcohol. That said, it is within the scope of the present invention for the water-soluble carrier tape to include some insoluble materials. For example, the water-soluble carrier tape may include a strength-enhancing fibrous material (e.g., wood pulp) for improving the strength of the carrier tape.

An exemplary methyl cellulose based water-soluble carrier tape is Aquasol® Water Soluble Paper, which is commercially available from Aquasol Corporation (North Tonawanda, N.Y.).

In the presence of water, the water-soluble carrier tape 11 will dissolve, thereby facilitating the transport of water toward the water-swellable particulate powder 12.

To further facilitate the transport of water toward the water-swellable particulate powder, the water-soluble carrier tape may include perforations. Exemplary perforations are disclosed in U.S. application Ser. No. 12/648,794 for a Perforated Water Blocking Element filed Dec. 29, 2009, (Parris), which is hereby incorporated by reference in its entirety. The perforations may be of any suitable profile (i.e., size, shape, and/or pattern). In this regard, although the perforations may be holes, other profiles, such as slits or flaps, are within the scope of the present invention.

A carrier tape described herein may be treated (e.g., coated) with a wetting agent (e.g., a surfactant) that promotes the transport of intruding water toward the water-swellable particulate powder. For example, a surfactant may reduce the surface tension of at least a portion of the carrier tape so that water can easily move through a perforation toward the water-swellable particulate powder.

Figure 2:
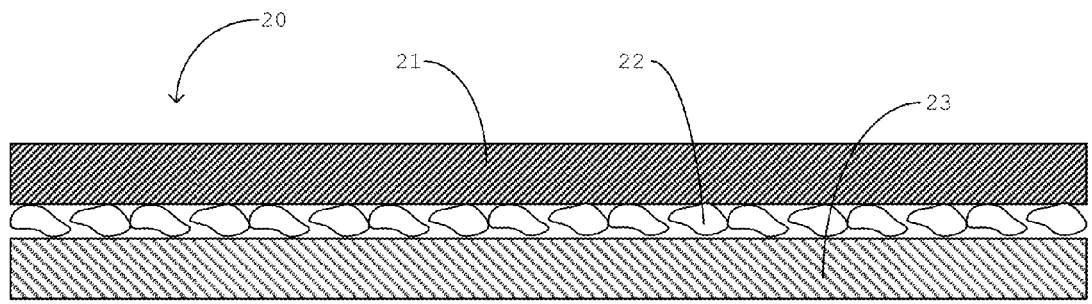
FIG. 2 schematically depicts a cross-sectional view of an exemplary three-layer water-blocking element according the present invention in which water-swellable powder is disposed between a water-soluble carrier tape and a second carrier tape.

FIG. 2 schematically depicts a cross-sectional view of a water-blocking element 20 according to another embodiment of the present invention. In particular, FIG. 2 depicts the water-blocking element 20 as having a three-layer structure that includes water-swellable particulate powder 22 disposed between a first carrier tape 21 and a second carrier tape 23. The water-swellable particulate powder 22 is typically bound (e.g., with an adhesive material) to at least one (and more typically both) of the carrier tapes 21, 23.

The first carrier tape is 21 is typically water-soluble, thereby facilitating the transport of water toward the water-swellable particulate powder 22. The second carrier tape 23 may, but need not, be water soluble. In this regard, exemplary water-insoluble carrier tapes are disclosed in U.S. application Ser. No. 12/648,794 for a Perforated Water Blocking Element. The first carrier tape 21 and/or the second carrier tape 23 may optionally include perforations.

A water-blocking element as described herein may be positioned within an optical-fiber cable between a buffer tube and its constituent optical fiber(s) such that the water-blocking element at least partially encloses the optical fiber(s). The water-blocking element is typically oriented within the buffer tube such that a water-soluble carrier tape is positioned between the optical fiber(s) and the water-swellable particulate powder. By positioning a water-soluble carrier tape between the optical fiber(s) and the water-swellable particulate powder, contact between dry (e.g., inactivated) water-swellable particulate powder and the optical fiber(s) can be avoided. In other words, the water-soluble carrier tape acts as a barrier between the inactivated water-swellable particulate powder and the optical fibers.

Inhibiting contact between dry water-swellable particulate powder and the optical fiber(s) is desirable, because contact between the optical fiber(s) and the dry water-swellable particulate powder (e.g., before its activation) could cause microbending in the optical fibers.

Moreover, the sensitivity of optical fibers to mechanical loads, as well as the desire to reduce cable dimensions, makes the use of a smoother carrier tape somewhat advantageous. Accordingly, a substantially smooth water-soluble carrier tape is typically employed to effectively separate the water-swellable particulate powder from the optical fiber(s). As noted, this separation helps reduce microbending and optical-fiber attenuation that could otherwise occur if the optical fiber(s) were to contact the water-swellable particulate powder, such as during cable installation.

\* \* \*

The carrier tapes disclosed herein should yield a reduced overall thickness of the water-blocking element. For example, the carrier tapes typically have a thickness of between about 0.05 millimeter and 0.5 millimeter, more typically between about 0.2 millimeter and 0.4 millimeter. In this regard and in contrast to conventional foam inserts, the carrier tapes are somewhat resistant to compression (e.g., less bulky). Such reduced bulk permits the dimensions of the fiber optic cable to be reduced or, alternatively, provides more free space for the optical fibers within the buffer tube.

In this regard, the carrier tapes of the present invention resist significant compression, such as that which occurs in foams having density reductions of 30 percent or more. By way of example, a water-blocking element in accordance with the present invention may have a carrier tape with a density of at least about $0.25 \text{ g/cm}^3$ (e.g., between about $0.50 \text{ g/cm}^3$ and $0.80 \text{ g/cm}^3$). In some embodiments, the water-blocking element may have a density of at least about $0.90 \text{ g/cm}^3$ (e.g., between about $1.0 \text{ g/cm}^3$ and $1.5 \text{ g/cm}^3$ or more). In other particular embodiments, the carrier tapes may possess only negligible compression properties (i.e., the carrier tape is substantially incompressible).

Furthermore, the carrier tape described herein may possess a Shore A hardness of more than about 25 (e.g., 30-40), typically more than about 45 (e.g., 50-60). For example, the carrier tape described herein may possess a Shore A hardness of more than about 65 (e.g., 70-80 or more).

As used herein, hardness refers to a material's resistance to indentation upon the application of a static load. This is conveniently measured using an appropriate Shore durometer (e.g., a Shore A durometer). The Shore A hardness scale is typically used for soft rubbers and the like; the Shore 00 hardness scale is typically used for foams that have Shore A hardness of less than about 5 (e.g., a Shore 00 hardness of less than about 45.) Shore hardness is typically measured at standard temperature and pressure (STP). As used herein, standard temperature and pressure (STP) refers to testing conditions of 50 percent relative humidity at 70° F. (i.e., about 20° C.) and atmospheric pressure (i.e., 760 torr).

Typically, the carrier tapes are relatively thin, thereby providing more space for optical fiber(s) to move within a buffer tube containing the water-blocking element. Therefore, a carrier tape itself will typically provide little coupling between the optical fiber(s) and the surrounding buffer tubes.

Those having ordinary skill in the art will recognize that for a buffer tube having a particular inner diameter, the water-blocking element should be thin enough such that the inner diameter of the buffer tube is greater than the combined thicknesses of all elements within the buffer tube. For example, the sum of twice the thickness of the water-blocking element, and the maximum cross-sectional width of the optical-fiber element (i.e., the optical fibers) should be less than the inner diameter of the buffer tube. (Those having ordinary skill in the art will recognize that the thickness of the water-blocking element is considered twice because it typically encircles the optical fibers.)

On the other hand, the carrier tape must not be too thin or it will too readily deform, thereby allowing bumps caused by the water-swellable particulate powder to be transferred through the carrier tape to the optical fibers.

\* \* \*

In another aspect, the present invention embraces a water-blocking element formed as a composite of water-swellable material, fibers, and a water-soluble binder.

Figure 3:
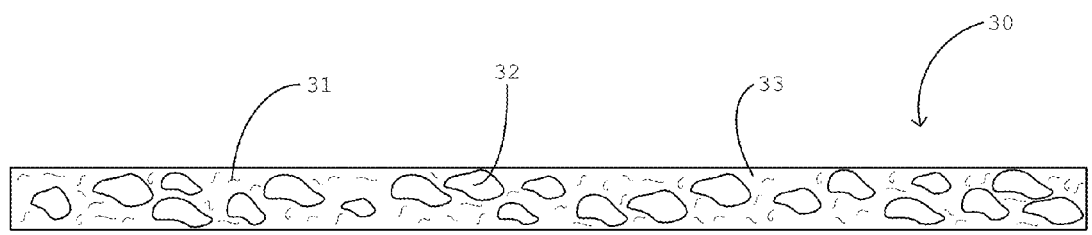
FIG. 3 schematically depicts a cross-sectional view of an exemplary composite water-blocking element according to the present invention.

In this regard, FIG. 3 schematically depicts an exemplary composite water-blocking element 30. The water-blocking element 30 includes water-swellable particulate powder 32 (e.g., SAP powder) and strength-enhancing fibers 31 (e.g., wood pulp) held together with (e.g., embedded within) a water-soluble binder 33, such as a polymeric resin (e.g., methyl cellulose resin). Alternative water-soluble binders include polyvinyl alcohol, hydroxyethyl cellulose, ethyl cellulose, cellulose ethers, and latex.

In the presence of water, the water-soluble binder will dissolve thereby facilitating the transport of water toward the water-swellable particulate powder.

The strength-enhancing fibers within the composite water-blocking element help to ensure that the composite water-blocking element has sufficient strength and structural integrity in the absence of water. In this regard, the composite water-blocking element typically has a longitudinal break strength of at least about 5 grams per millimeter of width (e.g., at least 10 grams per millimeter of width) under dry conditions (e.g., in the absence of water).

The composite water-blocking element typically has a thickness of less than about one millimeter, more typically less than about 0.5 millimeter (e.g., between about 0.1 millimeter and about 0.25 millimeter). That said, the composite water-blocking element typically is at least as thick as the largest dry water-swellable particle contained with the water-swellable particulate powder. In this way, the structure of the composite water-blocking element inhibits the dry water-swellable particulate powder from directly contacting any optical fibers, when the composite water-blocking element is positioned within a buffer tube. Therefore, undesirable optical-fiber attenuation can be avoided. In addition, the composite water-blocking element typically has a smooth surface (e.g., a surface adjacent to any optical fibers, typically the surface between the water-blocking element and any optical fibers) to further facilitate a reduction in optical-fiber attenuation.

In contrast to conventional foam inserts, the composite water-swellable element is somewhat resistant to compression. In other words, the carrier tapes of the present invention resist significant compression, such as that which occurs in foams having density reductions of 30 percent or more. In an exemplary embodiment, the composite water-blocking element has a density of at least about 0.25 g/cm$^3$ (e.g., between about 0.50 g/cm$^3$ and 0.80 g/cm$^3$). By way of further example, the water-blocking element may have a density of at least about 0.90 g/cm$^3$ (e.g., between about 1.0 g/cm$^3$ and 1.5 g/cm$^3$ or more). In some embodiments, the composite water-blocking element may be substantially incompressible (e.g., under dry conditions). Such reduced bulk (and increased density) permits the dimensions of an optical-fiber cable containing the composite water-blocking element to be reduced or, alternatively, provides more free space for the optical fibers within a buffer tube.

The foregoing notwithstanding, the composite water-blocking element may substantially expand in the presence of water. By way of example, a water-blocking element, having a thickness of about 0.5 millimeter under dry conditions, may expand to have of thickness of at least about 8 millimeters after being exposed to distilled water for about one minute.

\* \* \*

The water-swellable particulate powders contained within a water-blocking element in accordance with the present invention typically possess a particle size weight distribution in which the median particle diameter is less than about 500 microns, more typically between about 10 and 300 microns.

As will be understood by those familiar with bulk powder measurements, particle size may be measured via light scattering techniques. For example, particle sizes and distributions are often characterized according to ASTM B330-2 ("Standard Test Method for Fisher Number of Metal Powders and Related Compounds"). Alternatively, bulk particle sizes and distributions may be characterized using a Hegman Fineness number determined from ASTM D1210-79. Particle-size characterizations of particulate powders are described in U.S. Patent Application Publication No. US 2008/0274316 A1, which is herein incorporated by reference in its entirety.

The size (and size distribution) of the particulates in the water-swellable powder may influence the deformation of the water-blocking element. As noted, water-swellable powder may cause a carrier tape to deform. Thus, the size and quantity of the water-swellable particulates should be selected to prevent water-swellable powder "bumps" from causing optical attenuation (e.g., microbending).

Exemplary water-swellable materials typically include a matrix (e.g., ethylene vinyl acetate or rubber) enhanced with about 30 to 70 weight percent super absorbent polymers (SAPs), such as particulates of sodium polyacrylate, polyacrylate salt, or acrylic acid polymer with sodium salt. Such water-swellable materials can be processed on conventional hot melt adhesive machinery.

\* \* \*

A water-blocking element according to the present invention is typically disposed within a buffer tube in such a way as to surround the optical fiber(s). The width of the water-blocking element is typically the same as the inner circumference of the buffer tube. In some embodiments, however, the width of the water-blocking element is at least about ten percent greater than the buffer tube's inner circumference.

The water-blocking element is typically positioned directly adjacent to the inner wall of the buffer tube such that there is little, if any, unfilled space between the inner wall of the buffer tube and the water-blocking element. Otherwise, such unfilled space would allow water within the buffer tube to migrate longitudinally along the buffer tube's inner wall. The water-blocking element may be secured to the buffer tube, for example, using an adhesive, by melt-bonding part of the water blocking element to the buffer tube during extrusion, or by frictional coupling of the water-blocking element and the buffer tube. Suitable techniques for securing buffer-tube elements (e.g., via adhesives) are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

The water-blocking element of the present invention provides improved water-blocking within the buffer tube. If water intrusion (e.g., flooding) does occur, water tends to migrate radially inward toward the optical fibers (i.e., the optical-fiber element) contained within the buffer tube. As the water-soluble material (e.g., a water-soluble carrier tape or a water-soluble binder) dissolves, the water-swellable particulate powder will expand into the cavities and interstices surrounding the optical fibers. In this way, the water-blocking element helps to prevent transport of the water along the length of the optical-fiber cable.

Some unfilled space is usually provided adjacent the optical fibers (i.e., between the optical fibers and the water-soluble carrier tape). In this regard, free space, or so-called annular free space, between the optical fibers and the water-soluble carrier tape within the buffer tube allows the optical fibers to move more or less freely within the cable. For example, although the glass fibers and the polymeric buffer tube may respond differently to temperature changes, the optical fibers are not fixedly secured to the water-blocking element. Consequently, the optical fibers are not forced to move as the buffer tube thermally expands or contracts.

Moreover, as used herein in this context, the term "annular free space" is intended to characterize unfilled space that can exist between the optical-fiber element (i.e., the optical fibers) and its surrounding structure (i.e., around the entire perimeter of the optical-fiber element) regardless of the respective shapes of the optical-fiber cable and its components (e.g., a rectangular ribbon stack within a round buffer tube). In this regard, the term "annular free space" as used herein is not limited to the regular gap between two concentric tubes (or casings) having circular cross-sections (i.e., a perfect annulus).

That said, it is within the scope of the present invention to further include a coupling material between the optical fibers and the water-soluble carrier tape of the water-blocking element. Those having ordinary skill in the art will appreciate that to facilitate the transport of water through the water-soluble carrier tape to the water-swellable particulate powder (and thereby activating the water-blocking characteristics of the water-swellable particulate powder), the coupling material may be discontinuously provided upon the surface of the water-soluble carrier tape.

An exemplary coupling material is disclosed in commonly assigned U.S. Patent Application Publication No. US 2009/0003785 A1 and its related U.S. patent application Ser. No. 12/146,588 for a Coupling Composition for Optical Fiber Cables, filed Jun. 26, 2008, (Parris et al.). Likewise, the exemplary use of discrete domains of adhesive material to couple a water-swellable element and optical fibers is disclosed in commonly assigned U.S. Pat. No. 7,599,589 for a Gel-Free Buffer Tube with Adhesively Coupled Optical Element and commonly assigned U.S. Pat. No. 7,567,739 for a Fiber Optic Cable Having a Water-Swellable Element. Each of these patent publications and patent applications is hereby incorporated by reference in its entirety.

* * *

The present water-blocking elements may be included in optical-fiber cables and buffer tubes having relatively high filling coefficients and fiber densities. Furthermore, the smoothness of the present water-blocking elements facilitates acceptable cable-attenuation performance. In this regard, microscopy (e.g., using a scanning electron microscope (SEM)) has qualitatively confirmed that water-blocking elements described herein are typically smoother than conventional dry water-blocking elements.

As used herein, the term "buffer-tube filling coefficient" refers to the ratio of the total cross-sectional area of the optical fibers within a buffer tube versus the inner cross-sectional area of that buffer tube (i.e., defined by the inner boundary of the buffer tube). By way of clarification, the term "buffer-tube filling coefficient" excludes ribbon matrix materials (e.g., subunit and common ribbon matrices).

Additionally, as used herein, the term "cumulative buffer-tube filling coefficient" refers to the ratio of the total cross-sectional area of the optical fibers enclosed within buffer tubes versus the sum of the inner cross-sectional areas of the buffer tubes containing those optical fibers.

Buffer tubes containing the present water-blocking elements may have a buffer-tube filling coefficient of at least about 0.20, typically about 0.30 or more (e.g., at least about 0.40). Even higher filling coefficients are possible in buffer tubes containing bend-insensitive fibers. For example, such buffer tubes typically have a buffer-tubes filling coefficient of greater than 0.50, more typically at least about 0.60 (e.g., 0.70 or more). In this regard, buffer tubes in accordance with the present invention typically include between 12 and 432 optical fibers (e.g., 216 optical fibers configured as a 12×18 ribbon stack). That said, buffer tubes having higher fiber counts (e.g., at least 864 optical fibers) are within the scope of the present invention.

As described herein, by controlling (i) the particulate size distribution of water-swellable powder and (ii) certain parameters of a water-blocking element (e.g., thickness, strength, hardness, smoothness, and material) a considerable reduction in optical-fiber microbending can be achieved. Accordingly, optical-fiber cables containing the present water-blocking elements typically demonstrate exceptional resistance to attenuation as determined by temperature cycle testing, even though these cables typically possess relatively high buffer-tube filling coefficients. For example, optical-fiber cables in accordance with the present invention meet or exceed temperature cycling requirements as set forth in GR-20-CORE (6.6.3, Issue 3, May 2008), hereinafter referred to as the "GR-20-CORE temperature cycling requirement." The GR-20-CORE temperature cycling requirement is hereby incorporated by reference in its entirety.

Moreover, optical-fiber cables containing the present water-blocking elements typically demonstrate exceptional resistance to water penetration as determined by water-penetration testing. For example, optical-fiber cables in accordance with the present invention meet or exceed water-penetration requirements as set forth in GR-20-CORE (6.6.7, Issue 3, May 2008), hereinafter referred to as the "GR-20-CORE water-penetration requirement." The GR-20-CORE water-penetration requirement is hereby incorporated by reference in its entirety.

The optical-fiber cables according to the present invention may also meet or exceed certain Telcordia Technologies generic requirements for optical-fiber cables as set forth in GR-20-CORE (Issue 2, July 1998; Issue 3, May 2008), such as low-temperature and high-temperature cable bend (6.5.3), impact resistance (6.5.4), compression (6.5.5), tensile strength of cable (6.5.6), cable twist (6.5.7), cable cyclic flexing (6.5.8), mid-span buffer tube performance of stranded cable (6.5.11), cable aging (6.6.4), and cable freezing (6.6.5). These GR-20-CORE generic requirements (i.e., Issue 2, July 1998, and Issue 3, May 2008, respectively) are hereby incorporated by reference in their entirety.

* * *

The water-blocking elements according to the present invention may be deployed in various structures, such as those exemplary structures disclosed hereinafter.

As noted, one or more of the present water-blocking elements may be enclosed within a buffer tube. For instance, one or more water-blocking elements may be deployed in either a single fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

Such buffer tubes may contain conventional glass fibers or bend-insensitive glass fibers. An exemplary bend-insensitive glass fiber for use in the present invention is disclosed in U.S. Pat. No. 7,623,747 for a Single Mode Optical Fiber.

With respect to conventional and bend-insensitive optical fibers, the component glass fiber typically has an outer diameter of about 125 microns. With respect to an optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical-fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, optical fibers contained within buffer tubes and cables in accordance with the present invention typically include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

Such fibers may include a low-modulus primary coating for reducing the risk of microbending. A low-modulus primary coating can be combined with bend-insensitive fiber for providing unexpectedly superior reductions in microbend sensitivity.

As will be known by those having ordinary skill in the art, an exemplary buffer tube enclosing water-blocking elements as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present water-blocking elements may be contained within structures such as a metal tube or an outer protective sheath encapsulating one or more optical fibers. In either structure, no intermediate buffer tube is necessarily required.

Multiple optical fibers may be sandwiched, encapsulated, and/or edge bonded to form an optical-fiber ribbon. Optical-fiber ribbons can be divisible into subunits (e.g., a twelve-fiber ribbon that is splittable into six-fiber subunits). Moreover, a plurality of such optical-fiber ribbons may be aggregated to form a ribbon stack, which can have various sizes and shapes.

For example, it is possible to form a rectangular ribbon stack or a ribbon stack in which the uppermost and lowermost optical-fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical-fiber ribbons may be positioned within a buffer tube or other surrounding structure, such as a buffer-tube-free cable, that contain water-blocking elements according to the present invention. Subject to certain restraints (e.g., attenuation) it is desirable to increase the density of elements such as optical fibers or optical-fiber ribbons within buffer tubes and/or optical-fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical-fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present water-blocking elements may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing.

In other embodiments, the water-blocking elements according to the present invention may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,515,795 for a Water-Swellable Tape, Adhesive-Backed for Coupling When Used Inside a Buffer Tube and commonly assigned U.S. Pat. No. 7,599,589 for a Gel-Free Buffer Tube with Adhesively Coupled Optical Element, each of which is hereby incorporated by reference in its entirety.

As will be understood by those having ordinary skill in the art, a cable enclosing water-blocking elements as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical-fiber cable sheaths typically have a circular cross section, but cable sheaths alternatively may have an irregular or non-circular shape (e.g., an oval, trapezoidal, or flat cross-section).

By way of example, the water blocking elements according to the present invention may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general and as will be known to those having ordinary skill in the art, a strength member is typically in the form of a rod or braided/helically wound wires or fibers, though other configurations will be within the knowledge of those having ordinary skill in the art.

Optical-fiber cables containing water-blocking elements as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical-fiber cables may be installed within ducts, microducts, plenums, or risers. By way of example, an optical-fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Patent Application Publication No. 2008/0317410 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical-fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical-fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical-fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical-fiber cables may be directly buried in the ground or, as an aerial cable, suspended from a pole or pylori. An aerial cable may be self-supporting or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ optical fibers in a transmission system, connections are required at various points in the network. Optical-fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical-fiber cable assemblies (e.g., furcation assemblies) can separate and convey individual optical fibers from a multiple optical-fiber cable to connectors in a protective manner.

The deployment of such optical-fiber cables may include supplemental equipment. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing water-blocking elements according to the present invention may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

* * *

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. patent application Ser. No. 12/794,229 for a Large Bandwidth Multimode Optical Fiber Having a Reduced Cladding Effect, filed Jun. 4, 2010, (Molin et al.); U.S. patent application Ser. No. 12/878,449 for a Multimode Optical Fiber Having Improved Bending Losses, filed Sep. 9, 2010, (Molin et al.); U.S. patent application Ser. No. 12/884,834 for a Multimode Optical Fiber, filed Sep. 17, 2010, (Molin et al.); U.S. patent application Ser. No. 12/887,813 for an Optical Fiber for Sum-Frequency Generation, filed Sep. 22, 2010, (Richard et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); and U.S. patent application Ser. No. 12/959,866 for a High-Bandwidth Multimode Optical Fiber Having Reduced Bending Losses, filed Dec. 3, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. patent application Ser. No. 12/843,116 for a Tight-Buffered Optical Fiber Unit Having Improved Accessibility, filed Jul. 26, 2010, (Risch et al.); U.S. patent application Ser. No. 12/881,598 for Methods and Devices for Cable Insertion into Latched Conduit, filed Sep. 14, 2010, (Leatherman et al.); U.S. patent application Ser. No. 12/907,241 for a High-Fiber-Density Optical-Fiber Cable, filed Oct. 19, 2010, (Overton et al.); and U.S. patent application Ser. No. 12/907,265 for an Optical-Fiber Cable Having High Fiber Count and High Fiber Density, filed Oct. 19, 2010, (Tatat et al.).

* * *

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. An optical-fiber cable, comprising:
a plurality of optical fibers;
a buffer tube enclosing said plurality of optical fibers, said buffer tube possessing a filling coefficient of at least about 0.20;
a water-blocking element positioned between said plurality of optical fibers and said buffer tube, said water-blocking element comprising (i) a water-soluble, first carrier tape and (ii) water-swellable particulate powder bonded to said first carrier tape, wherein said water-blocking element at least partially surrounds said plurality of optical fibers, and wherein said first carrier tape is positioned adjacent to said plurality of optical fibers and said water-swellable powder is positioned opposite said plurality of optical fibers; and
a polymeric cable jacket surrounding said buffer tube;
wherein the optical-fiber cable complies with the GR-20-CORE temperature cycling requirement.
2. An optical-fiber cable according to claim 1, wherein said buffer tube possesses a filling coefficient of at least about 0.50; and
the optical-fiber cable complies with the GR-20-CORE temperature cycling requirement.
3. An optical-fiber cable according to claim 1, wherein the optical-fiber cable complies with the GR-20-CORE water-penetration requirement.

4. An optical-fiber cable according to claim 1, comprising a second carrier tape, said water-swellable particulate powder being disposed between said first carrier tape and said second carrier tape.

5. An optical-fiber cable according to claim 4, wherein said second carrier tape is water-soluble.

6. An optical-fiber cable according to claim 1, wherein said first carrier tape comprises methyl cellulose, ethyl cellulose, hydroxyethyl cellulose, latex powder, cellulose ether, and/or polyvinyl alcohol.

7. An optical-fiber cable according to claim 1, wherein said first carrier tape comprises a strength-enhancing fibrous material.

8. An optical-fiber cable according to claim 1, wherein said first carrier tape is substantially incompressible.

9. An optical-fiber cable according to claim 1, wherein said first carrier tape possesses a density of at least about 0.25 g/cm$^3$.

10. An optical-fiber cable according to claim 1, wherein said first carrier tape possesses a density of at least about 0.90 g/cm$^3$.

11. An optical-fiber cable according to claim 1, wherein said first carrier tape is a non-foamed carrier tape.

12. An optical-fiber cable according to claim 1, wherein said first carrier tape comprises a plurality of perforations.

13. An optical-fiber cable, comprising:
an optical fiber;
a buffer tube enclosing said optical fiber;
a water-blocking element positioned between said optical fiber and said buffer tube, said water-blocking element comprising (i) a water-soluble, first carrier tape possessing a density of at least about 0.25 g/cm$^3$, (ii) a water-soluble, second carrier tape possessing a density of at least about 0.25 g/cm$^3$, and (iii) a water-swellable particulate powder disposed between said first carrier tape and said second carrier tape and bonded to said first carrier tape and/or said second carrier tape, wherein said water-blocking element at least partially surrounds said optical fiber, and wherein said first carrier tape is positioned adjacent to said optical fiber and said water-swellable powder is positioned opposite said optical fiber; and
a polymeric cable jacket surrounding said buffer tube.

14. An optical-fiber cable according to claim 13, wherein:
said buffer tube encloses a plurality of optical fibers, said buffer tube possessing a filling coefficient of at least about 0.20; and
the optical-fiber cable complies with the GR-20-CORE temperature cycling requirement.

15. An optical-fiber cable according to claim 13, wherein said buffer tube possesses a filling coefficient of at least about 0.50; and
the optical-fiber cable complies with the GR-20-CORE temperature cycling requirement.

16. An optical-fiber cable according to claim 13, wherein the optical-fiber cable complies with the GR-20-CORE water-penetration requirement.

17. An optical-fiber cable according to claim 13, wherein said first carrier tape comprises methyl cellulose, ethyl cellulose, hydroxyethyl cellulose, latex powder, cellulose ether, and/or polyvinyl alcohol.

18. An optical-fiber cable according to claim 13, wherein said first carrier tape comprises a strength-enhancing fibrous material.

19. An optical-fiber cable according to claim 13, wherein said first carrier tape is substantially incompressible.

* * * * *